United States Patent [19]

Boyce

[11] 4,277,736
[45] Jul. 7, 1981

[54] ENERGY CONTROLLER FOR CONVERSION FROM A DIRECT CURRENT SOURCE TO A VARIABLE FREQUENCY LOAD

[75] Inventor: Jay Boyce, Anaheim, Calif.

[73] Assignee: Jay Boyce & Associates, Anaheim, Calif.

[21] Appl. No.: 98,980

[22] Filed: Nov. 30, 1979

[51] Int. Cl.³ .......................... H02P 7/42; H02P 7/64
[52] U.S. Cl. .................................. 318/811; 318/510; 318/512
[58] Field of Search ............... 318/801, 807, 810, 811, 318/812, 510, 512, 513, 341, 345 G; 363/130, 138, 124, 135; 323/89 MS

[56] References Cited

U.S. PATENT DOCUMENTS

| | | | |
|---|---|---|---|
| 2,697,197 | 12/1954 | Brown | 323/89 MS |
| 3,351,841 | 11/1967 | Lipman et al. | 363/124 |
| 3,406,325 | 10/1968 | Rosa | 318/807 |
| 3,891,913 | 6/1975 | Rao et al. | 363/135 |
| 4,128,793 | 12/1978 | Stich | 318/808 |

Primary Examiner—David Smith, Jr
Attorney, Agent, or Firm—Willie Krawitz

[57] ABSTRACT

A turn off circuit for a multiphase motor is provided, comprising a D.C. powered system including a three element choke core having two outer cores with loosely coupled windings and a central core closely coupled to the outer cores to enhance pulse generation.

A modified SCR ring counter is provided to supply D.C. power to the load to produce a three phase wave shape with less wave distortion and lower noise.

Pulse width modulation is supplied to the negative SCRs of the ring counter through steering SCRs which are turned on by discharge from capacitors in the steering circuit.

Pulse width modulation is fed to the ring counter through the outer core elements, while the central core functions to improve pulse width of the discharge capacitors. Free wheeling energy from the motor is fed to the discharge capacitors and increases firing energy.

10 Claims, 6 Drawing Figures

ENERGY CONTROLLER FOR CONVERSION FROM A DIRECT CURRENT SOURCE TO A VARIABLE FREQUENCY LOAD

BACKGROUND OF THE INVENTION

This invention relates to a turn off circuit for a multiphase motor, and is a continuation-in-part of U.S. Patent Application Ser. No.: 073,646 filed on Sept. 10, 1979 which is turn, is a continuation-in-part of U.S. Patent Application Ser. No.: 933,656 filed on Aug. 14, 1978 now patent No. 4,214,196.

The above two prior applications, describe a novel, threelegged choke coupling between the central pulse generator core and a tight coupling between the central pulse generator core and the outer cores. To further reduce heat losses in the windings due to trapped energy in the chokes of the outer cores, an improved energy recovery system is included. In addition, it is desirable to reduce oscillations of the power SCRs which occur after firing. Also, it is desirable to facilitate recovery of energy trapped in the outer cores for return to the battery; this will occur when the load is being braked. Furthermore, since quiet operation of a turn off circuit is less annoying, besides reducing energy consumption, a quieter running circuit is obviously desirable. Finally, if energy trapped in the outer core can be more effectively tranferred to the pulse forming capacitors which fire the SCRs, rather than being dissipated or retained as heat, circuit firing will be more uniform and stable, and this will improve overall efficiency.

The apparatus of this invention has application not only to variable speed motors which may be used in electric cars, but also to stationary drives which supply power to variable load devices. As an example, although many machines in industrial plants operate at varying loads, they are powered by constant speed motors. To accommodate for these varying load requirements, the machine output may be reduced or throttled back while still operating under a constant load. Obviously, if an effective variable control could be found for the motor, considerable energy savings would be effected since the output requirements of the motor could be decreased when the load on the machine is reduced.

In addition, it would be desirable to recover decay energy from the motor for firing the SCRs which receive a pulse width modulation signal in response to changes in power requirements. Recovery of decay energy reduces power consumption that otherwise would form heat and noise. Also, if the discharge times of the capacitors which fire the SCRs are increased, this would improve their firing characteristics.

THE INVENTION

According to the invention, a turn off circuit is provided for a multiphase motor, comprising: 1. a D.C. powered system, including a single, three element choke core having outer cores with loosely coupled outer windings to reduce rf transients, and a central core being closely coupled to each outer core to enhance pulse generation; 2. plurality of steering SCRs are connected between the central core and an outer core, and these SCRs receive pulse width modulation signals from a controller which provides a signal in response to demand from the load. One or more discharge capacitors are employed to fire the SCRs, and the close coupling between the central and outer cores improves the pulse generation characteristics of the discharge capacitors. Pulse firing times in the order of 100-300 microseconds are obtained at about 100 volts ($E_b$) as compared to 50-100 microseconds at 200 volts ($E_b$) in my two above prior applications. 3. in addition, inductance decay energy produced by the motor during free wheeling is fed to the steering SCRs and discharge capacitors to increase their firing energy. 4. an SCR ring counter applies D.C. power to the motor to produce a three phase wave shape with less distortion and lower noise; pulse width modulation is supplied to the ring counter from the steering SCRs. 5. a plurality of regeneration diodes are utilized to recover excess energy from the discharge capacitors for return to the D.C. source.

DESCRIPTION OF THE PREFERRED EMBODIMENT

Figure 1:
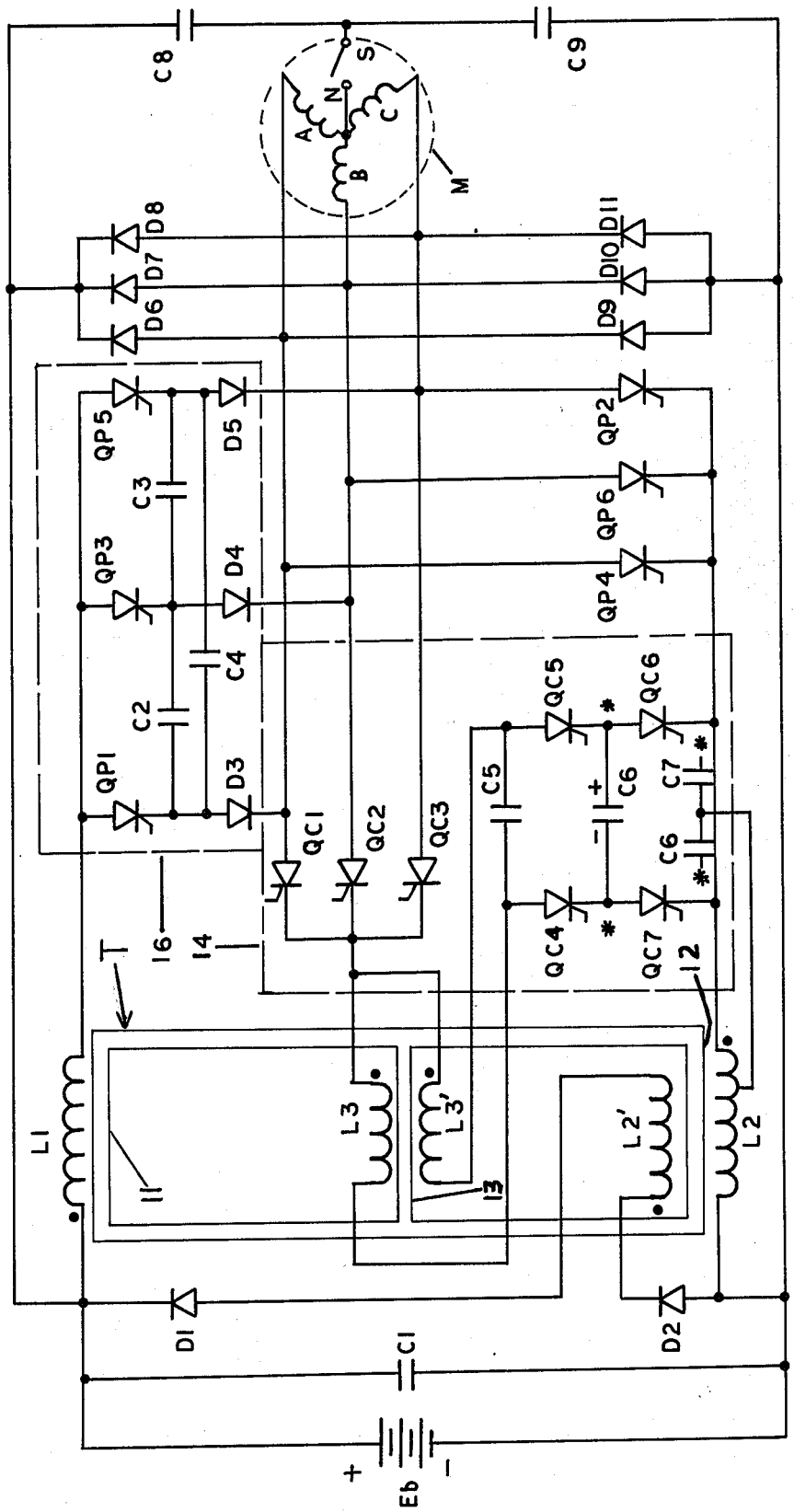
FIG. 1 is a schematic diagram showing the three core choke and the turn off circuit of this invention.

The three core choke and turn off circuit of this invention is shown in FIG. 1, and comprises a three core transformer T having outer core elements 11, 12 and a central core 13. The three cores having windings L1, L2 and L3 respectively. Outer windings L1 and L2 are loosely coupled to reduce di/dt firing and rf transients, while central windings L3, L3' are closely coupled to outer winding L2 to enhance pulse generation. An auxiliary winding L2' is provided to transfer trapped energy from winding L2 to the battery.

A capacitor C1 also may be employed as an energy trap for return to the battery. Energy trapped by winding L2' is passed from the negative terminal of a storage battery through a diode D2 and then to the positive side of the battery through D1.

Figure 4:
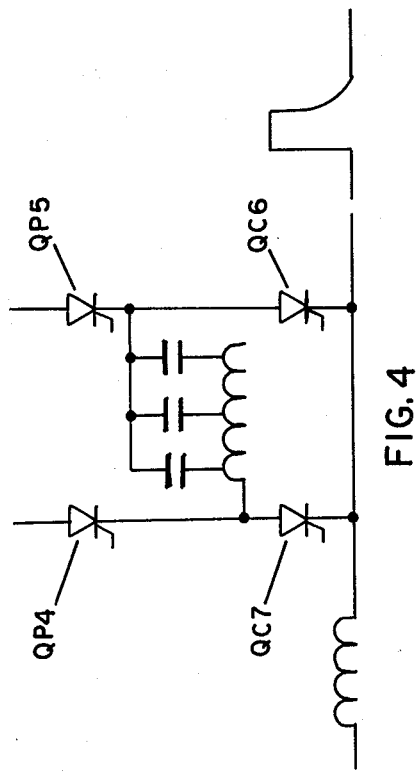
FIG. 4 is a circuit diagram showing a pulse forming capacitor arrangement in the steering SCR circuit.

Signals from a pulse width modulation control system (FIG. 2) are sent to an energy steering circuit 14 shown in dotted designation. The steering circuit includes energy recovery SCRs QC4 and QC5, energy discharge SCRs QC6 and QC7, an SCR turn off capacitor C5 for QC6 and QC7, and energy storage capacitors C6 and C7. FIG. 4 shows parallel connected, turn off capacitors which may be substituted for capacitors C6, C7.

A network of turn off SCRs QC1, QC2 and QC3, central pulse generating winding L3 and L3', and capacitor C6 (C7) form a pulse modulated turn off network to negative SCRs QP2, QP4 and QP6. Diodes D6-D11 are employed to transfer recirculation and surge currents back to the battery. Capacitors C8 and C9, like C1, form an energy trap for eddy and surge currents for return to the battery. Turn off pulses having a sharp pulse configuration are provided with a single capacitor C6. A broader, trapezoidal shaped pulse of about 50-100 microseconds width is obtained if two capacitors C6, C7 are employed in series. If the capacitor arrangement shown in FIG. 4 is employed in place of C6, a trapezoidal pulse of about 100-300 microsecond pulse width is obtained. L3' and C5 are utilized to guarantee that QC4 and QC6 turn off before QC5 and QC7; in addition, capacitor C5 isolates QC4 from QC5. Both L3' and C5 can be omitted, but the turn off is not as effective.

A positive side, 120° turn off network 16 is provided for the motor M, and includes SCRs QP1, QP2 and QP3, turn off capacitors C2, C3 and C4, and diodes D3, D4 and D5.

A neutral switch, S is used to ensure that capacitors C6, C7 are charged before SCRs QP2, QP4 and QP6 are energized. On slow-down of the motor, the switch S may be closed causing diodes D6–D11 to charge the battery. Capacitors C8, C9 aid in regeneration since they ensure the motor stator remains magnetized.

Figure 2:
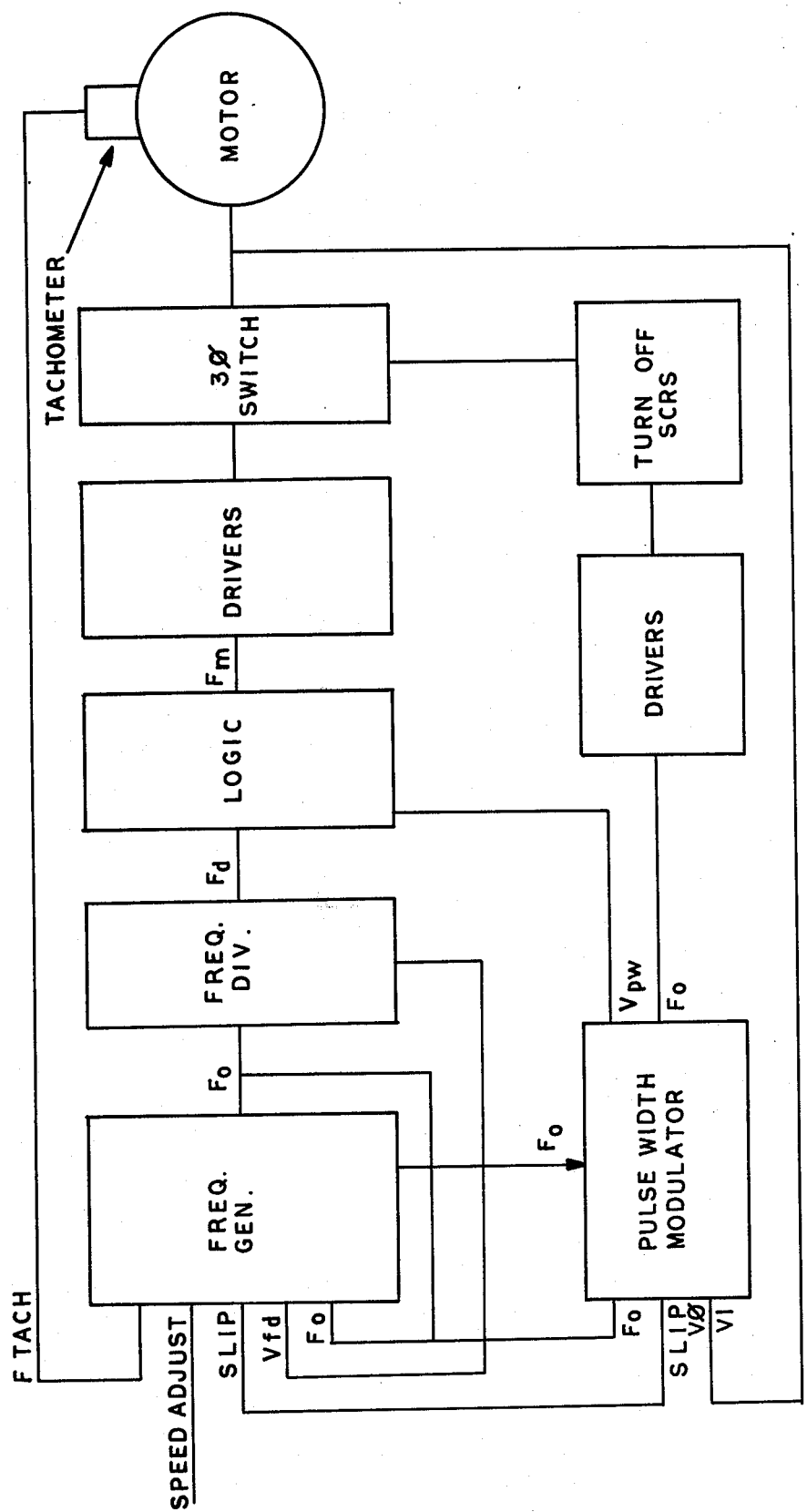
FIG. 2 shows a block diagram of the pulse width modulation control system.

A block diagram of the pulse modulation system is illustrated in FIG. 2. The desired motor speed, determined by the speed control set point, along with the actual speed of the motor, as determined by a tachometer and the frequency are fed into a frequency generator. When the frequency proportional to oscillator frequency exceeds the tachometer frequency, the slip frequency will be increased until the output becomes some maximum value. Similarly, when the tachometer frequency exceeds the oscillator frequency, the slip frequency is decreased until it becomes a negative maximum.

Information from the frequency generator is fed to a frequency divider (for reducing saturation at low speeds) and then to a logic unit which sequences turn on of the SCRs QC4, QC5, QC6 and QC7. The difference between the time of turn on of SCRs QP1–QP6 and the time of turn on of SCRs QC4–QC7 will determine the pulse width and hence voltage control. A driver circuit amplifies the logic signals to operating levels prior to feeding to QP1–QP6.

A pulse width modulator receives information in oscillator frequency converted to voltage, slip, motor current and voltage proportional to AC voltage delivered to the motor, and determines optimum pulse width times (i.e. voltage) for the motor. If desired, current detectors may be provided on one or more legs of the motor winding, and voltage proportional to current is fed back to the pulse width modulator which is varied if the current becomes excessive. For example, slow motor speeds require a shorter pulse width to reduce motor saturation; also, depending on motor speeds, frequency division is used to reduce "cogging" at low speeds, and to avoid harmonics. The pulse width modulation information is then fed to a 180° flip flop for control of amplifier drivers and a turn off control including SCRs QC4–QC7.

Figure 3:
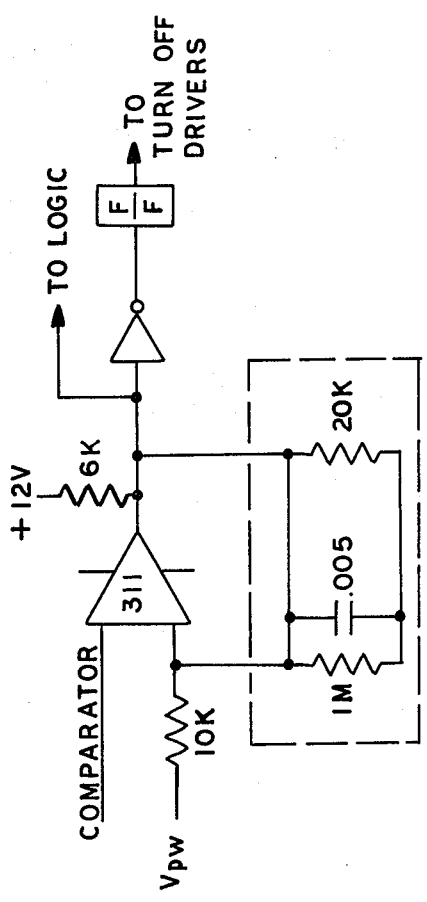
FIG. 3 is a circuit diagram of a comparator circuit with a feedback network which provides reliable switching.

FIG. 3 shows a preferred comparator turn off circuit employing an operational amplifier which provides an excellent switching function; the portion of the circuit in dotted designation is used to produce a stable feedback.

In operation, when switch S is closed on start up, and for a logic circuit turn on of QP1 and QP2, current will flow from the positive battery terminal through L1, QP1, D3, the motor windings, QP2, and L2 to the battery negative. Since no SCR is actually on when the switch is closed, the current flow through L1 will not form a pulse in L3, L3' but will go through QP1 and D3 to the motor windings. Capacitors C6 (C7) will be charged due to oscillations that produce a current diversion into these two capacitors. The switch S is then opened after QP4, QP6 or QP2 is energized.

After a time determined by the pulse width modulator, SCRs QC3, QC4 and QC6 are fired. QC6 discharges the voltage and energy from − to + at the capacitor C6 into L2. This increase in voltage at the upstream of L2 applies the voltage on QP2 and turns it off. After the next turn of QP1 and QP2, and for a proper delay time as determined by the pulse width modulator, QC5 and QC7 are fired to discharge C6 (C7) after receiving decay energy from the motor. The SCR pairs QC4–QC6 and QC5–QC7 thus fire sequentially and alternately.

Figure 5:
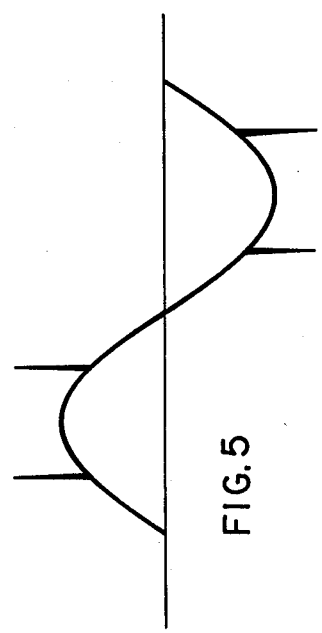
FIGS. 5 and 6 show the waveforms produced across the motor windings.
Figure 6:
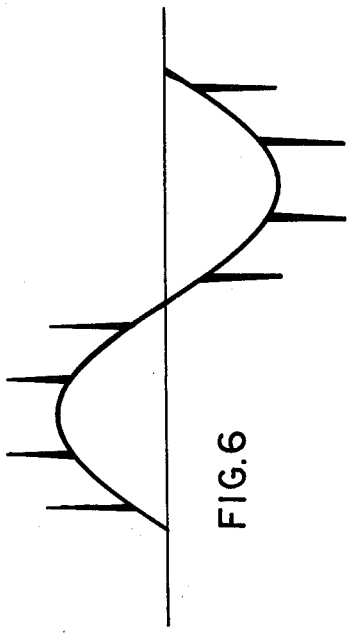

The waveforms produced by the motor windings in FIGS. 5 and 6 show very little overall distortion from the basic sine wave form except for the superimposed pulses.

It will be appreciated that while the circuit arrangement shows turn off being applied to the negative SCRs QP2, QP4 and QP6, the entire arrangement could be reversed and turn off power could be applied to positive SCRs QP1, QP3 and QP5.

Overall, the following improvements are obtained over my above prior filed applications: reduced di/dt firing on the power SCRs is obtained; rf transients are reduced; pulse generation is improved; inductance decay energy from the motor can be recovered; and, the acoustical noise level is greatly reduced. Hence, the efficiency of the system is improved.

I claim:

1. A turn off circuit for a multiphase motor, comprising:
   i. a D.C. powered system, including a single, three element choke core having outer cores with loosely coupled outer windings to reduce rf transients, and a central core being closely coupled to each outer core to enhance pulse generation;
   ii. a plurality of steering SCRs connected between the central core and an outer core for receiving pulse width modulation signals from a controller which provides the signals in response to motor load demand;
   iii. one or more discharge capacitors for turning off the steering SCRs, the close coupling between the central and outer cores improving pulse generation characteristics of the discharge capacitors, inductance decay energy produced by the motor during free wheeling being fed to the steering SCRs and discharge capacitors to increase firing energy;
   iv. an SCR ring counter for applying D.C. power to the motor to produce a three phase wave shape with less distortion and lower noise, pulse width modulation being supplied to the ring counter from the steering SCRs; and,
   v. a plurality of regeneration diodes for recovery of excess energy from the discharge capacitors and return to the D.C. source.

2. The turn off circuit of claim 1, providing pulse firing times of the steering SCRs of about 100–300 microseconds at about 100 volts $E_b$.

3. The turn off circuit of claim 1, providing a switch connected to both ends of the D.C. source at its neutral load, the switch being adapted on closing, to charge the discharge capacitors.

4. The turn off circuit of claim 3, including a plurality of energy recovery diodes, the switch being adapted on closing during free wheeling of the motor, to charge the battery through the diodes.

5. The turn off circuit of claim 1, including a control system, comprising: a speed control; a frequency generator; a plurality of power SCRs for switching the D.C. power to the motor the frequency output being adapted to control actual motor speed by means of the power SCRs; a logic circuit for sequential switching of the power SCRs and on off switching of turn off SCRs; and, a pulse width modulator for applying an optimum pulse width to the motor in response to voltage, frequency, slip and voltage delivered to the motor, the pulse width controlling the on off SCRs.

6. The turn off circuit of claim 1, including a steering circuit, comprising at least two pairs of steering SCRs, each pair of SCRs being adapted to fire in alternate sequence, a single pair comprising a charging SCR and a discharge SCR.

7. A apparatus for controlling a variable speed, multiphase motor, comprising:
   i. a D.C. powered system, including a single, three element choke core having outer cores with loosely coupled outer windings to reduce rf transients, and a central core being closely coupled to each outer core to enhance pulse generation;
   ii. a plurality of steering SCRs connected between the central core and an outer core for receiving pulse width modulation signals from a controller which provides the signals in response to motor load demand;
   iii. one or more discharge capacitors for turning off the steering SCRs, the close coupling between the central and outer cores improving pulse generation characteristics of the discharge capacitors, inductance decay energy produced by the motor during free wheeling being fed to the steering SCRs and discharge capacitors to increase firing energy;
   iv. an SCR ring counter for applying D.C. power to the motor to produce a three phase wave shape with less distortion and lower noise, pulse width modulation being supplied to the ring counter from the steering SCRs; and,
   v. a plurality of regeneration diodes for recovery of excess energy from the discharge capacitors and return to the D.C. source; the method comprising applying the pulse width modulation signals to the motor to vary the motor speed in response to load demand.

8. The apparatus of claim 7, including a control system for the multiphase motor, comprising: a speed control; a frequency generator; a plurality of power SCRs for switching the D.C. supply to the motor, the frequency output being adapted to control actual motor speed by means of the power SCRs; a logic circuit for sequential switching of the power SCRs and on off switching of turn off SCRs; and, a pulse width modulator for applying an optimum pulse width to the motor in response to voltage, frequency, slip and voltage delivered to the motor, the pulse width controlling the on off SCRs.

9. The apparatus of claim 7, providing a switch connecting the neutral load to both ends of the D.C. source, the switch being adapted on closing, to charge the discharge capacitors.

10. The apparatus of claim 7 providing a plurality of energy recovery diodes, including the switch being adapted to close on regeneration and during free wheeling of the motor, and to charge the battery through the diodes.

* * * * *